United States Patent [19]

Cinnamond

[11] Patent Number: 4,991,888
[45] Date of Patent: Feb. 12, 1991

[54] CHILD-PROOFING DEVICE FOR TAPE CASSETTE PLAYERS

[76] Inventor: Edwin T. Cinnamond, 231 N. Fourth St., Danville, Ky. 40422

[21] Appl. No.: 476,258

[22] Filed: Feb. 7, 1990

[51] Int. Cl.$^5$ .............................................. E05C 19/18
[52] U.S. Cl. .................................... 292/296; 292/288; 292/DIG. 38
[58] Field of Search ............... 292/296, 297, 292, 259, 292/290, 80, 87, DIG. 38; 220/315

[56] References Cited

U.S. PATENT DOCUMENTS

| | | | |
|---|---|---|---|
| 777,342 | 12/1904 | Homer | 292/296 |
| 4,004,734 | 1/1977 | Hadtke | 220/315 |
| 4,529,235 | 7/1985 | Florentine, Sr. | 292/259 R X |
| 4,623,177 | 11/1986 | McKinney | 292/87 |
| 4,832,384 | 5/1989 | Venable | 292/87 |

Primary Examiner—Richard E. Moore
Attorney, Agent, or Firm—Charles J. Brown

[57] ABSTRACT

A child-proofing device for a tape cassette player having a flanged tongue element insertable through a cassette opening past the door thereof and adapted to be pulled back through an exterior block with detent means to hold the door closed, and to be removed by releasing the detent means, pushing the tongue element forward and then pulling it out of the cassette opening as the door is held open.

5 Claims, 1 Drawing Sheet

U.S. Patent
Feb. 12, 1991
4,991,888
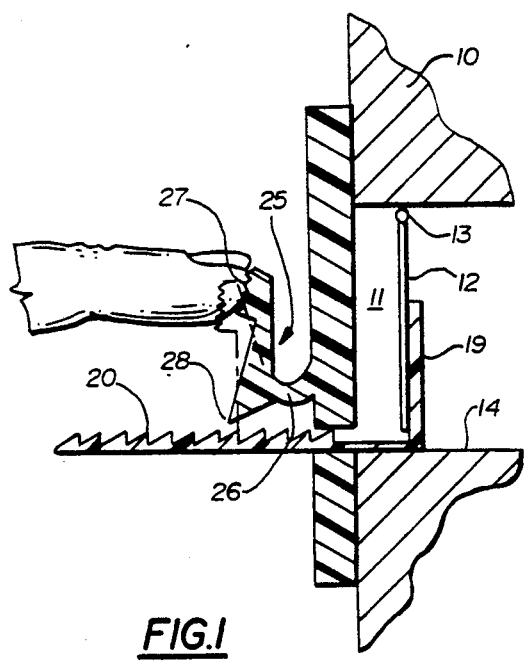
FIG.1
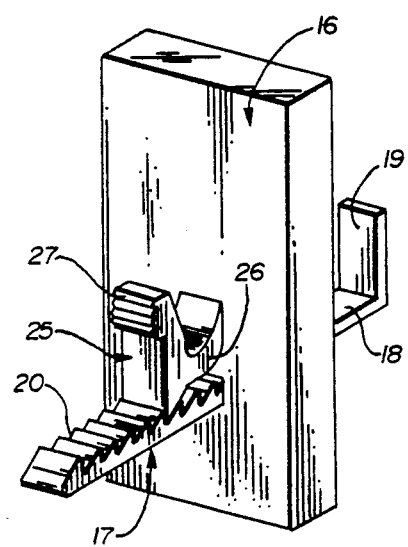
FIG.2
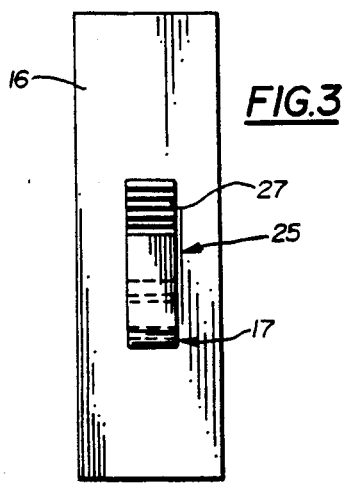
FIG.3
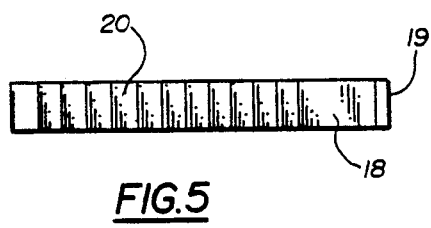
FIG.5
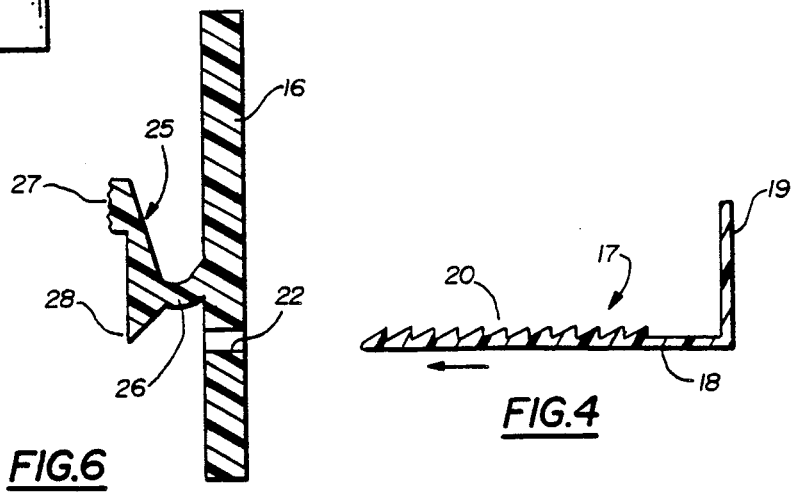
FIG.6
FIG.4

CHILD-PROOFING DEVICE FOR TAPE CASSETTE PLAYERS

BACKGROUND OF THE INVENTION

Security devices for preventing tampering with tape cassette players, particularly video cassette recorders, are well known. Some are key-operated locks to prevent theft, such as those described in U.S. Pat. Nos. 4,527,405, 4,616,490 and 4,640,106. Others are intended to forestall unauthorized operation and involve key-operated devices which prevent insertion of a cassette, such as those described in U.S. Pat. Nos. 4,628,713 and 4,655,057. All such designs are relatively complicated multi-part assemblies typical of locks operated by keys.

Another category of security devices for cassette players are those designed to prevent small children from inserting their hands or foreign objects into the cassette opening. The principal characteristic of such devices should be simplicity and low cost, much the same as designs for child-proof caps on medicine bottles. The only device in this category which is presently known is that described in U.S. Pat. No. 4,629,089, a box-like enclosure surrounding the entire cassette player and having its own hinged door held closed by a simple catch mechanism incapable of being operated by a small child.

It is the purpose of the present invention to provide a child-proofing device of the latter category with a minimum of parts and of extremely low cost.

SUMMARY OF THE INVENTION

The invention provides a child-proofing device for a tape cassette player having a cassette opening with a pivotable door. It includes a tongue element and flange means on one end portion of the tongue element adapted to be pushed through the opening past the door and then pulled back to hold the door closed from inside the opening. It is withdrawn by pushing the tongue element forward so that the flange means clears the door and then pulling it out of the opening as the door is held manually open. Block means are included for spanning the opening on the outside thereof. Releasable detent means are provided for selectively interconnecting the tongue element and block means to hold the flange means in its closing position against the door.

In a preferred form the device of the invention consists only of two parts, (a) the tongue element and (b) the block and detent means. The detent means is preferably a resilient member extending from and integral with the block means and is adapted to be bent manually out of engagement with ratchet teeth on the tongue element. It is preferred that the integral block and detent means be of plastic and that the tongue element be in a snug sliding fit within a hole in the block.

BRIEF DESCRIPTION OF THE DRAWINGS

FIG. 1 is a fragmentary vertical section showing the assembled device of the invention in operating position within a cassette player opening and illustrating the two positions of the detent means;

FIG. 2 is a pictorial view of the device of the invention showing the tongue element inserted in the block;

FIG. 3 is a front elevation of the device of the invention;

FIG. 4 is a section taken longitudinally through the tongue element;

FIG. 5 is a top plan view of the tongue element;

FIG. 6 is a section taken longitudinally through the block and detent means.

DESCRIPTION OF PREFERRED EMBODIMENT

Turning first to FIG. 1 a tape cassette player such as a video cassette recorder includes a frame 10 defining an opening 11 which is closed by a conventional door 12 hinged at 13. The door 12 extends almost to a floor 14 of the opening 11 in its closed position and folds upwardly and back into the opening 11 when opened. It is the principal purpose of the present invention to provide a security device to hold the door 12 closed to prevent small children from inserting their hands or foreign objects into the opening 11.

As shown in FIGS. 2 and 3, the device of the invention preferably consists only of two parts, a block 16 and a tongue element 17 each with its components described below. Each is preferably molded from a resilient plastic material such as an acetyl copolymer sold by the E.I. duPont Nemours & Co., Inc. of Wilmington, Del., U.S.A., under the trademark DELRIN-500. The tongue element 17 includes an elongated body 18 as shown particularly in FIGS. 4 and 5. On the upper side of the righthand end portion of the body 18 is an integral upstanding flange 19 at right angles to the body 18. As illustrated in FIG. 1 the height of the flange 19 is substantially less than the height of the opening 11 in the cassette player and therefore the flange is sized to fit through the opening 11 past the door 12. Ratchet teeth 20 are formed across the same upper side of the body 18 at its end portion opposite the flange 19. The ratchet teeth 20 are inclined toward the flange 19 as shown in FIG. 4.

The block 16 is sufficiently large to span the outside of the opening 11 vertically as shown in FIG. 1. It is formed with a hole 22 as illustrated particularly in FIG. 6. The hole 22 is rectangular in cross section. Its width is only slightly greater than the width of the body 18 of the tongue element 17 and its height is substantially equal to the height of the body including the ratchet teeth 20. The tongue element 17 is intended to be assembled with the body 16 by being pushed through the hole 22 from the backside of the body in the direction of the arrow in FIG. 4 to project from the front side as shown in FIG. 2. The sizing of the hole 22 is such that the tongue element is in a snug sliding fit within it.

Extending from the front side of the block 16 opposite the face thereof into which the tongue element 17 is inserted is an integral projecting member 25 of approximately the same width as the hole 22. The member 25 includes a bendable neck 26, a preferably knurled actuating surface 27 and a downwardly projecting detent 28. The lower end of the detent 28 is at approximately the level of the axial centerline of the hole 22 so that as the tongue element 17 is inserted through the hole 22 the detent 28 engages one of the ratchet teeth 20 after the next until insertion of the tongue element 17 is stopped at some particular position, for example as shown in FIG. 2. As illustrated particularly in FIG. 1, the detent 28 can be lifted out of engagement with the ratchet teeth 20 on the tongue element 17 simply by pushing with the tip of the finger against the actuating surface 27 and bending the member 25 up and back about the neck portion 26 thereof. Such bending causes no permanent deformation of the neck 26 of the member 25 because it is resilient and its yield strength is not exceeded, and therefore the detent 28 returns to engagement with the ratchet teeth 27 when the finger pressure on the actuating surface 27 is removed.

When put to use the tongue element 17 is pushed in snug sliding relation through the hole 22 from the backside of the block 16 to approximately the position shown in FIG. 2. To secure the door of a cassette player opening, the user pushes on the actuating surface 27 to release the detent 28 from the teeth 20 and then pushes the tongue element 17 forwardly so that the flange 19 thereof is spaced well away from the backside of the body 16. The flange 19 of the tongue element 17 is then pushed through the opening 11 to swing the door 12 open until the door 12 drops closed behind the flange 19. The user then pulls on the opposite end of the tongue element 17 extending outwardly from the block 16 thereby drawing the flange 19 forwardly into engagement with the backside of the closed door 12 as shown in FIG. 1. During this pulling of the tongue element 17 the detent 28 easily slides from one of the ratchet teeth 20 to the next since they are all inclined toward the flange 19. In the closed position shown in FIG. 1 the member 25 and its detent means 28 are in the dotted line position shown with the detent abutting one of the ratchet teeth. In that closed position it is not possible to open the door 12 of the opening 11 in the cassette player and therefore a small child is unable to insert a hand or fingers or foreign objects into the opening 11.

To release the device and remove it from the cassette player the user simply pushes with the finger on the actuator surface 27 as shown in FIG. 1 to lift the detent 28 out of engagement with the teeth 20 of the tongue element 17. That outer end portion of the tongue element 17 is then pushed inwardly to back the flange 19 off the closed door 12. When the flange 19 is sufficiently clear of the door 12, the user manually swings the door to an open position above the flange 19. The device may then be pulled out of the opening 11 and the door 12 is allowed to close behind it.

For other than small children this is a simple sequence of steps, but there is no likelihood that they would be carried out by children of an age with which this invention is concerned. Children under the age of approximately seven years have not yet developed the motor skills and judgment required to complete the sequence of steps. The device of the invention therefore provides simple low-cost child-proofing for tape cassette players.

The scope of the invention is to be determined from the following claims rather than the foregoing description of a preferred embodiment.

I claim:

1. A child-proofing device for a tape cassette player having a cassette opening with an inwardly pivotable door comprising
    (a) a tongue element comprising
        i. an elongated body,
        ii. a flange on one side of one end portion of the body sized to fit through the opening past the door, and
        iii. ratchet teeth across the same side of the body at the opposite end portion thereof and inclined toward the flange;
    (b) a block sized to span the outside of the opening and formed with a hole through which said opposite end portion of the body is insertable; and
    (c) detent means on the block engageable with the ratchet teeth on said opposite end portion of the body to prevent and disengageable therefrom to allow displacement of the flange relative to the body;
    (d) whereby after the flange is inserted through the opening past the door the opposite end portion of the body is pulled back to bring the flange against the backside of the closed door and be held there by the detent means engaging the ratchet teeth and upon disengagement of the detent said opposite end portion is pushed to displace the flange inwardly clear of the door and then pulled out of the cassette opening while the door is manually held open.

2. A tape cassette player child-proofing device according to claim 1 wherein the detent means is a resilient member extending from the block on that side thereof opposite the side through which the tongue element is inserted, the detent means normally engaging the ratchet teeth and being adapted to be bent manually out of engagement therewith.

3. A tape cassette player child-proofing device according to claim 2 wherein the block and detent are one integral part of resilient plastic material.

4. A tape cassette player child-proofing device according to claim 1 wherein the body of the tongue element is in a snug sliding fit within the hole in the block.

5. A child-proofing device for a tape cassette player having a cassette opening with an inwardly pivotable door comprising
    (a) a tongue element comprising
        i. an elongaged body,
        ii. a flange on one side of one end portion of the body sized to fit through the opening past the door, and
        iii. a first interconnector on the body at the opposite end portion thereof;
    (b) a block sized to span the outside of the opening and formed with an aperture through which said opposite end portion of the body is insertable; and
    (c) a second interconnector on the block engageable with the first interconnector on said opposite end portion of the body to prevent and disengageable therefrom to allow displacement of the flange relative to the body;
    (d) whereby after the flange is inserted through the opening past the door the opposite end portion of the body is pulled back to bring the flange against the backside of the closed door and be held there by the second interconnector engaging the first interconnector and upon disengagement of the second interconnector opposite end portion is pushed to displace the flange inwardly clear of the door and then pulled out of the cassette opening while the door is manually held open.

* * * * *